(12) United States Patent
Heitkamp

(10) Patent No.: US 11,865,675 B2
(45) Date of Patent: *Jan. 9, 2024

(54) ELECTRICALLY ISOLATED FASTENER DRIVING DEVICE

(71) Applicant: APEX BRANDS, INC., Apex, NC (US)

(72) Inventor: Timothy Edward Heitkamp, Tipp City, OH (US)

(73) Assignee: APEX BRANDS, INC., Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,894

(22) Filed: Jun. 21, 2022

(65) Prior Publication Data

US 2022/0314402 A1    Oct. 6, 2022

Related U.S. Application Data

(63) Continuation of application No. 16/865,624, filed on May 4, 2020, now Pat. No. 11,389,931, which is a
(Continued)

(51) Int. Cl.
*B25B 13/06* (2006.01)
*B25B 13/48* (2006.01)
(Continued)

(52) U.S. Cl.
CPC .............. *B25B 13/06* (2013.01); *B25B 13/48* (2013.01); *B29C 45/0001* (2013.01); *B29K 2309/08* (2013.01)

(58) Field of Classification Search
CPC ......... B25B 13/16; B25B 13/48; B25B 13/06; B29C 45/0001; B29K 2309/08
See application file for complete search history.

(56) References Cited

U.S. PATENT DOCUMENTS 2,025,838 A    12/1935    Van
2,457,451 A    12/1948    Domack
(Continued)

FOREIGN PATENT DOCUMENTS

CA    2231130 C    2/2002
CN    2062679 U    9/1990
(Continued)

OTHER PUBLICATIONS

Decision of Rejection issued in corresponding Chinese Application No. 201980038955.7 dated Jan. 12, 2023.
(Continued)

*Primary Examiner* — David B. Thomas
(74) *Attorney, Agent, or Firm* — BURR & FORMAN LLP

(57) ABSTRACT

An electrically isolated socket may include a drive body, a driven body, and a body portion. The driven body may be made of first metallic material and having a driven end configured to receive a fastener. The drive body may be made of a second metallic material and having a drive end configured to receive a protrusion of a driving tool. The body portion may over-mold substantially all portions of the drive body and the driven body other than the drive end and the driven end, respectively. The drive end of the drive body and the driven end of the driven body may face away from each other, and the drive body and driven body each include axial grooves. The axial grooves of the drive body each extend substantially perpendicular to an annular groove formed in the drive body from the annular groove formed in the drive body to the drive end, and the axial grooves of the driven body each extend substantially perpendicularly to an annular groove formed in the driven body from the annular groove formed in the driven body to the driven end.

19 Claims, 10 Drawing Sheets

Related U.S. Application Data continuation of application No. 16/061,713, filed as application No. PCT/US2016/067256 on Dec. 16, 2016, now Pat. No. 10,675,738.

(60) Provisional application No. 62/269,730, filed on Dec. 18, 2015.

(51) Int. Cl.
*B29C 45/00* (2006.01)
*B29K 309/08* (2006.01)

(56) References Cited

U.S. PATENT DOCUMENTS

| | | | |
|---|---|---|---|
| 2,476,762 | A | 7/1949 | Petre et al. |
| 3,859,821 | A | 1/1975 | Wallace |
| 3,868,874 | A | 3/1975 | Olashaw |
| 3,873,863 | A | 3/1975 | Pew |
| 4,927,403 | A | 5/1990 | Pate |
| 5,485,769 | A | 1/1996 | Olson |
| 5,970,826 | A | 10/1999 | Iwinski et al. |
| 6,029,547 | A | 2/2000 | Eggert et al. |
| 6,126,882 | A | 10/2000 | Iwinski et al. |
| 6,295,904 | B1 | 10/2001 | Webb |
| 6,962,098 | B2 | 11/2005 | Eggert et al. |
| 7,077,037 | B2 | 7/2006 | Sheveia |
| 7,082,864 | B1 | 8/2006 | Weber |
| 7,841,261 | B2 | 11/2010 | Milligan et al. |
| 7,882,769 | B2 | 2/2011 | Lin |
| 9,144,893 | B2 | 9/2015 | Su |
| 9,827,654 | B2 | 11/2017 | Su |
| 9,863,191 | B1 | 1/2018 | Ide |
| 10,435,954 | B1 | 10/2019 | Ide |
| 10,675,738 | B2 | 6/2020 | Heitkamp |
| 10,753,159 | B1 | 8/2020 | Ide |
| 10,906,161 | B2 | 2/2021 | Xu |
| 11,027,400 | B2 | 6/2021 | Raskin et al. |
| 11,318,586 | B2 | 5/2022 | Batsa et al. |
| 11,351,664 | B2 | 6/2022 | Batsa et al. |
| 11,389,931 | B2 * | 7/2022 | Heitkamp ............... B25B 13/06 |
| 2008/0309444 | A1 | 12/2008 | Sorg et al. |
| 2009/0095138 | A1 | 4/2009 | Lin |
| 2012/0042754 | A1 | 2/2012 | Chen |
| 2012/0060656 | A1 | 3/2012 | Chang |
| 2013/0341069 | A1 | 12/2013 | Demaretz |
| 2015/0336246 | A1 | 11/2015 | Peters et al. |
| 2016/0082582 | A1 | 3/2016 | Barker |
| 2017/0106701 | A1 | 4/2017 | Ito |

FOREIGN PATENT DOCUMENTS

| | | |
|---|---|---|
| CN | 2073351 U | 3/1991 |
| CN | 101121259 A | 2/2008 |
| CN | 201963668 U | 9/2011 |
| CN | 103029088 A | 4/2013 |
| CN | 103380307 A | 10/2013 |
| CN | 203726391 U | 7/2014 |
| CN | 204226465 U | 3/2015 |
| DE | 3144901 A1 | 5/1983 |
| DE | 202018102624 U1 | 5/2018 |
| DE | 102018118335 A1 | 1/2020 |
| EP | 0747179 | 12/1996 |
| EP | 0861139 A1 | 9/1998 |
| EP | 1047529 A1 | 11/2000 |
| EP | 2673518 A1 | 12/2013 |
| FR | 2240083 | 3/1975 |
| FR | 0861139 | 9/1998 |
| WO | 1998027654 A2 | 6/1998 |
| WO | 2012107754 A2 | 8/2012 |
| WO | 2017106701 A1 | 6/2017 |
| WO | 2018204468 A1 | 11/2018 |

OTHER PUBLICATIONS

Office Action issued in corresponding Chinese Application No. 202010400526.4 dated Apr. 27, 2021.
Examination Report issued in corresponding Australian Application No. 2019295630 dated Jun. 2, 2021.
Office Action issued in corresponding U.S. Appl. No. 17/055,714 dated Sep. 21, 2021.
Extended European Search Report from corresponding European Application No. 122169149.6, dated Aug. 4, 2022.
International Search Report and Written Opinion of PCT/US2016/067256 dated May 17, 2017.
Chapter 1 International Preliminary Report on Patentability of PCT/US2016/067256 dated Jun. 19, 2018.
International Search Report and Written Opinion of PCT/US2018/030603 dated Aug. 17, 2018.
First office action from corresponding Chinese Application No. 201680081860.X dated Jun. 3, 2019.
International Search Report and Written Opinion of international application No. PCT/US2019/038668 dated Oct. 1, 2019.
International Search Report and Written Opinion of international application No. PCT/US2020/018041 dated May 4, 2020.
Office action from related Chinese Application No. 201880029152.0 dated Jun. 10, 2020.
International Search Report and Written Opinion of international application No. PCT/US2020/026592 dated Jul. 21, 2020.
European Search Report from related European application No. 19207774.1 dated Mar. 3, 2020.
Chinese Office Action dated Jan. 4, 2021 in Chinese application No. 201880029152.0.
Mexican Office Action dated Jan. 21, 2021 in Mexican application No. MX/a/2020/012109.
Extended European Search Report dated Feb. 18, 2022 in European application No. 21208161.6.
Extended European Search Report from corresponding European Application No. 20783594.3, dated Oct. 31, 2022.
Extended European Search Report from corresponding European Application No. 20782483.0, dated Oct. 25, 2022.
Office Action issued in corresponding Chinese Application No. 2020800254995 dated Mar. 7, 2022.
Office Action issued in corresponding Chinese Application No. 2020800255822 dated Mar. 14, 2022.
Extended European Search Report issued in corresponding European Application No. 19824659.7 dated Jul. 6, 2022.

* cited by examiner

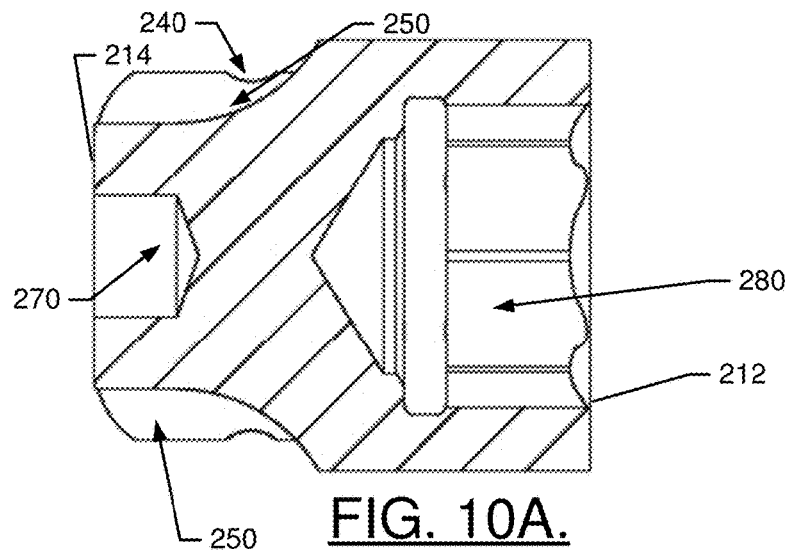
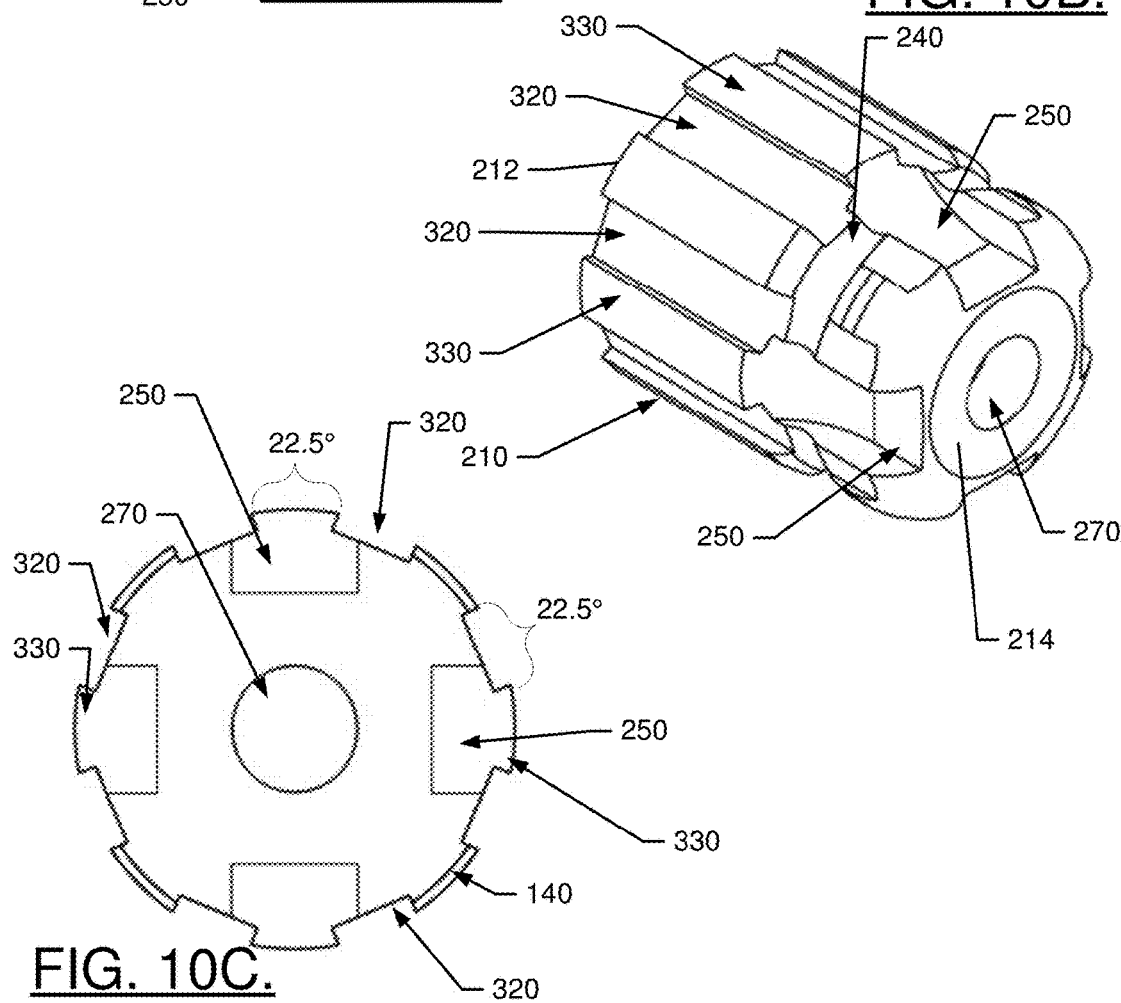

ELECTRICALLY ISOLATED FASTENER DRIVING DEVICE

CROSS-REFERENCE TO RELATED APPLICATIONS

This application is a continuation of U.S. application Ser. No. 16/865,624 filed May 4, 2020, which is a continuation of U.S. application Ser. No. 16/061,713 filed on Jun. 13, 2018 which is a National Phase entry of International Application No. PCT/US2016/067256 filed on Dec. 16, 2016 which claims benefit of U.S. Provisional Application No. 62/269,730 filed Dec. 18, 2015, each of which is incorporated by reference herein in its entirety.

TECHNICAL FIELD

Example embodiments generally relate to socket tools or other driving devices and, in particular, relate to a driving device tool that is desirable for use in environments where work occurs around electrically charged components.

BACKGROUND

Socket tools, such as socket wrenches, are familiar tools for fastening nuts and other drivable components or fasteners. The sockets of these tools are generally removable heads that interface with the socket wrench on one side and interface with one of various different sizes of nut or other fastener on the other side. Because high torque is often applied through these tools, and high strength and durability is desirable, the sockets are traditionally made of a metallic material such as iron or steel. However, metallic materials can also corrode or create spark or shock hazards when used around electrically powered equipment.

Although it may be possible to coat a metallic socket in a material that is non-conductive, such material is typically not suitable for coverage of either the driving end of the socket (i.e., the end that interfaces with the wrench) or the driven end of the socket (i.e., the end that interfaces with the nut or other fastener being tightened by the socket wrench) directly contacting the driving tool or fastener. In this regard, the high torque and repeated contact with metallic components would tend to wear such materials away over time and degrade the performance of the tool. Thus, it is most likely that the ends of the socket directly contacting the driving tool or fastener would remain (or revert to) exposed metallic surfaces resulting in the socket potentially conducting electricity and becoming a shock or spark hazard.

Thus, it may be desirable to provide a new design for an electrically isolated socket or other fastener driving device.

BRIEF SUMMARY OF SOME EXAMPLES

Some example embodiments may enable the provision of a socket or other fastener driving device that includes a driven end and driving end that are electrically isolated. In this regard, each of the driven end and the driving end may be formed of separate metallic bodies that are electrically isolated from each other via an over-molding process.

In accordance with an example embodiment, an electrically isolated driving device is provided. The electrically isolated driving device may include a drive body, a driven body, and a body portion. The driven body may be made of first metallic material and having a driven end configured to receive a fastener. The drive body may be made of a second metallic material and having a drive end configured to receive a protrusion of a driving tool. The body portion may over-mold substantially all portions of the drive body and the driven body other than the drive end and the driven end, respectively. The drive end of the drive body and the driven end of the driven body may face away from each other, and the drive body and driven body each include axial grooves. The axial grooves of the drive body each extend substantially perpendicular to an annular groove formed in the drive body from the annular groove formed in the drive body to the drive end, and the axial grooves of the driven body each extend substantially perpendicularly to an annular groove formed in the driven body from the annular groove formed in the driven body to the driven end.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 3A:
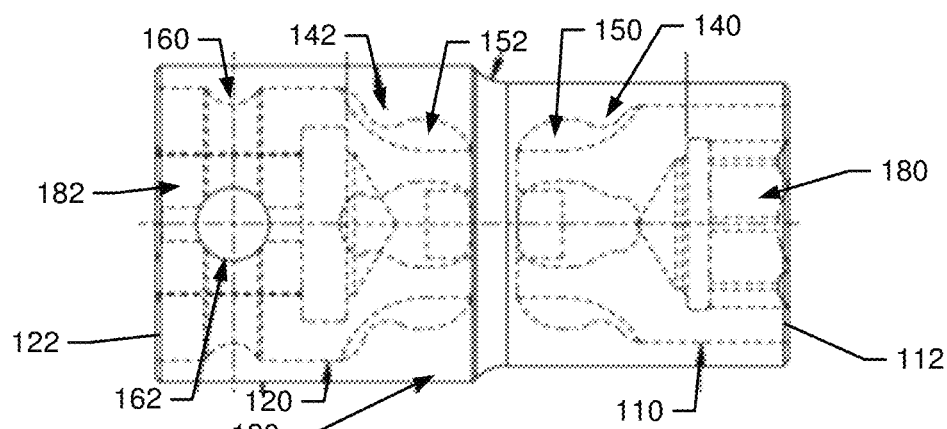
Figure 3B:
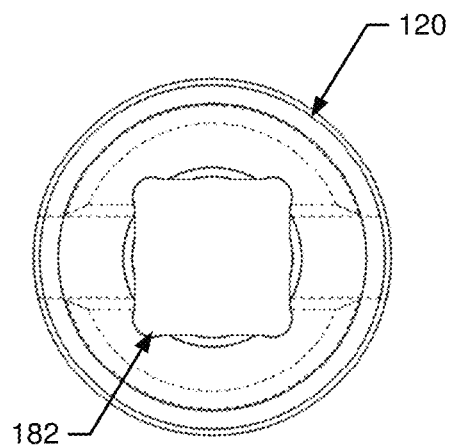
Figure 3C:
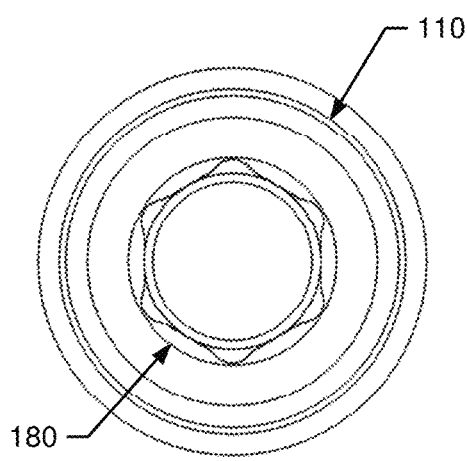
Figure 4A:
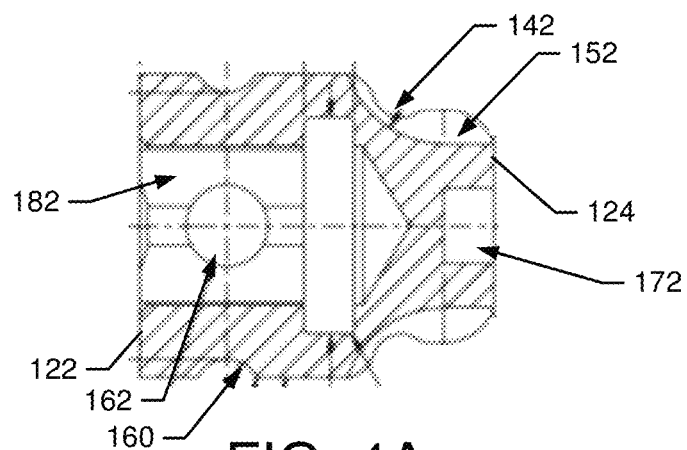
Figure 4B:
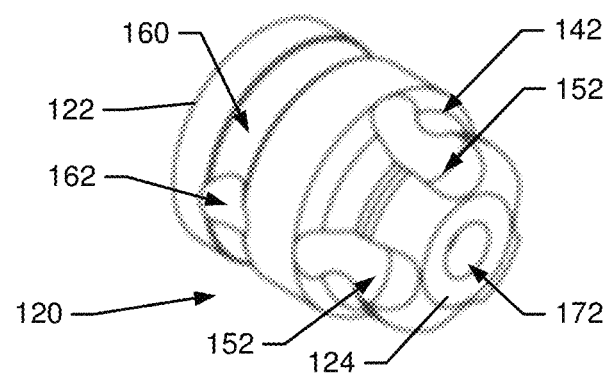
Figure 4C:
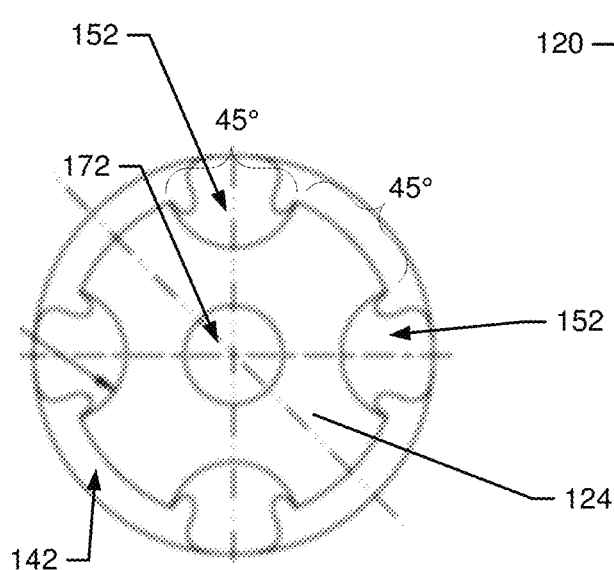
Figure 5A:
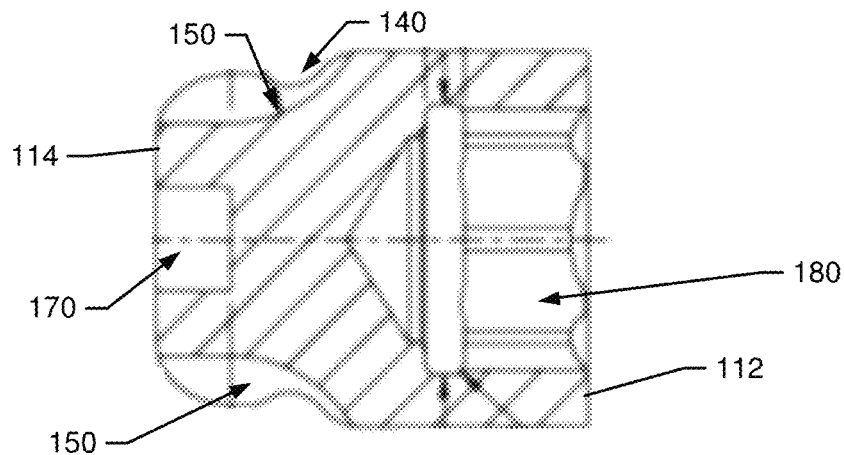
Figure 5B:
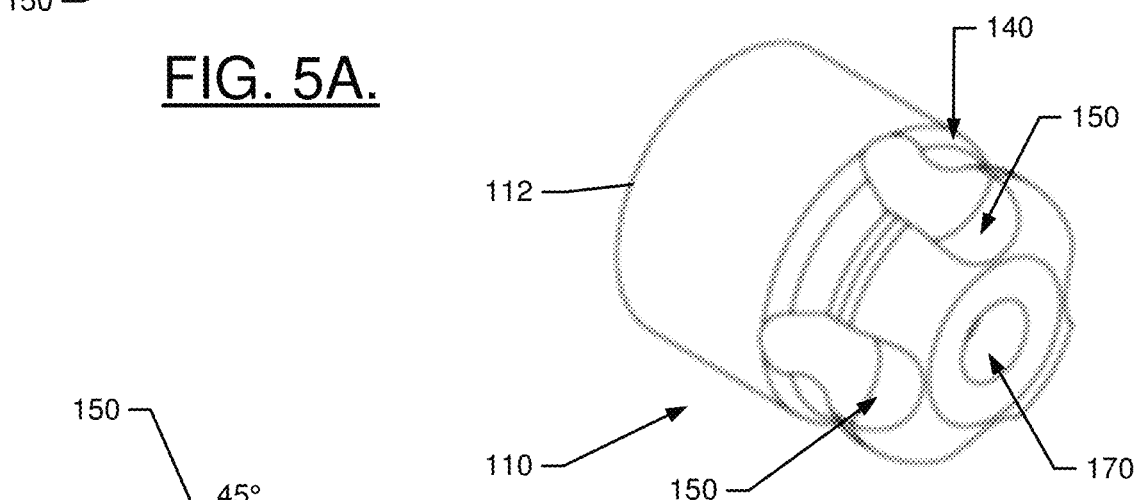
Figure 5C:
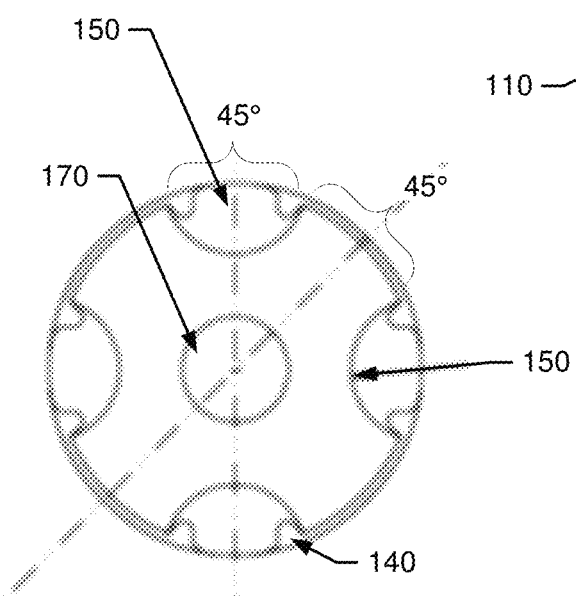
Figure 6:
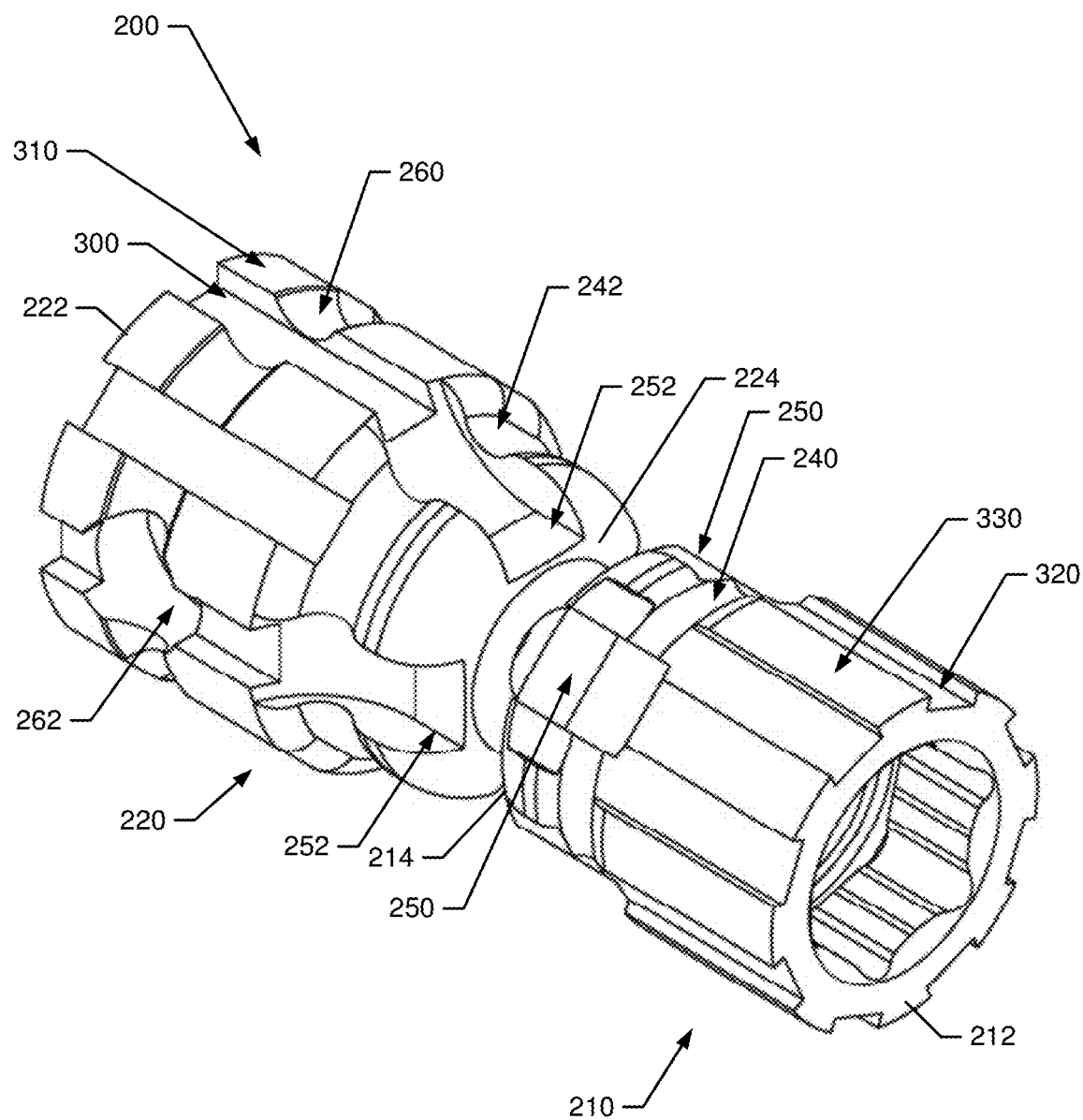
Figure 7:
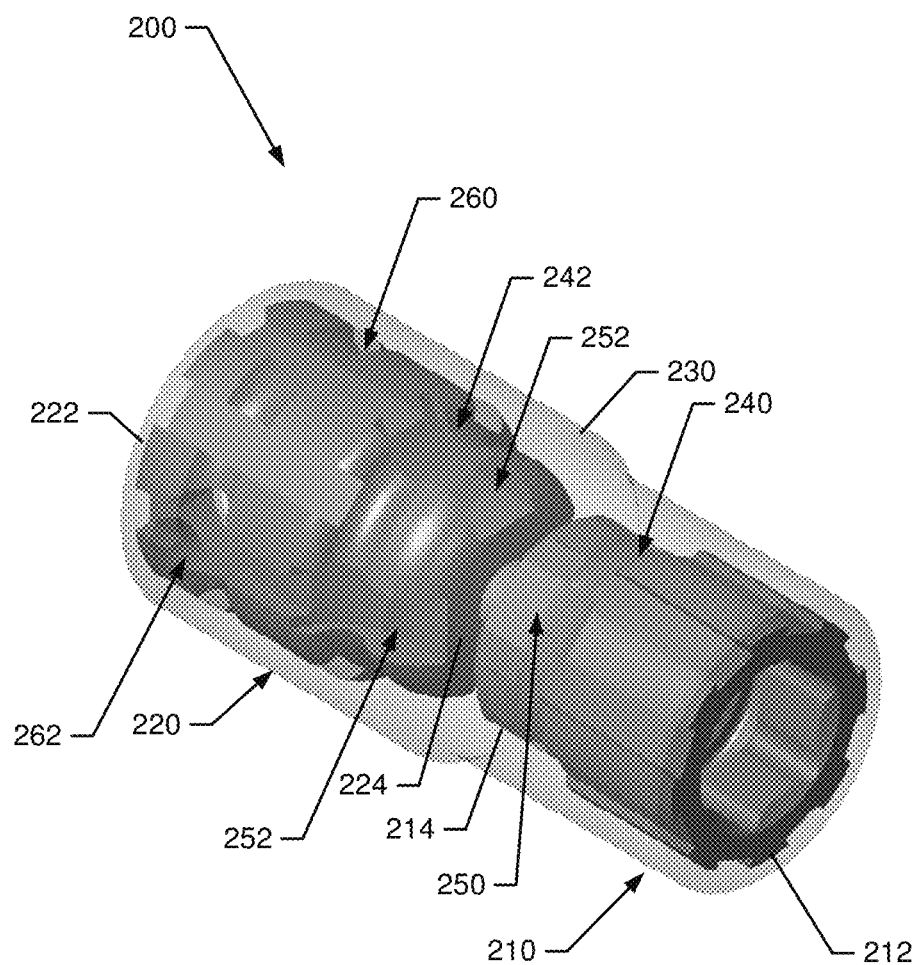
Figure 8A:
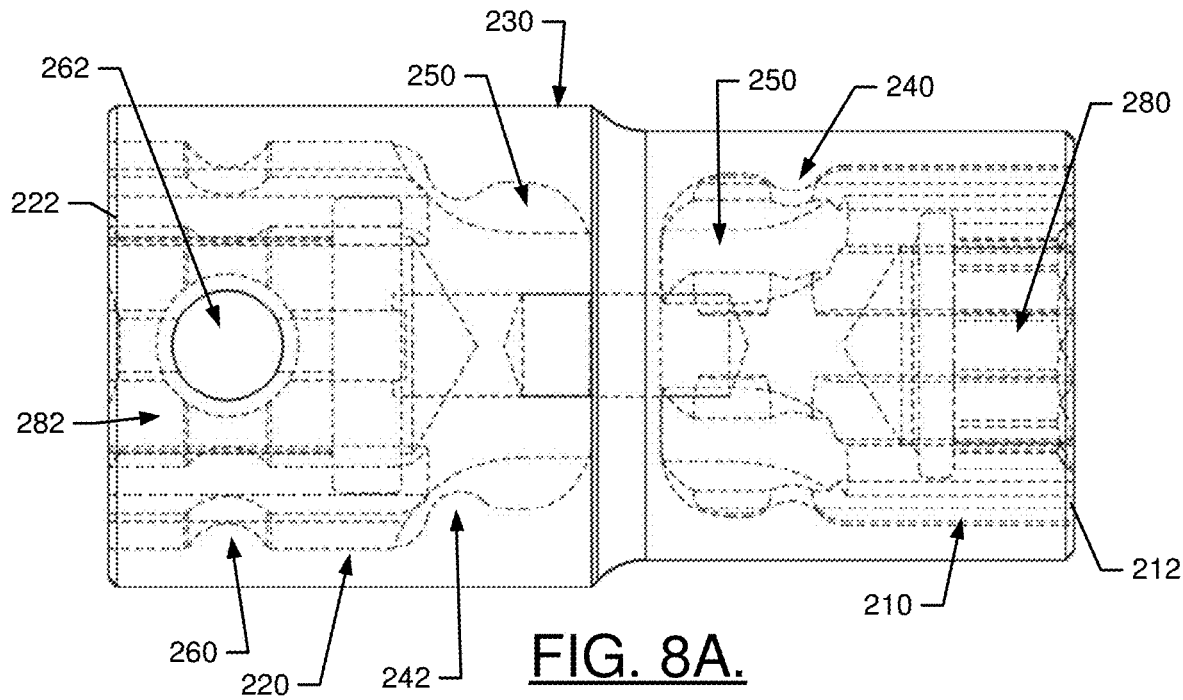
Figure 8B:
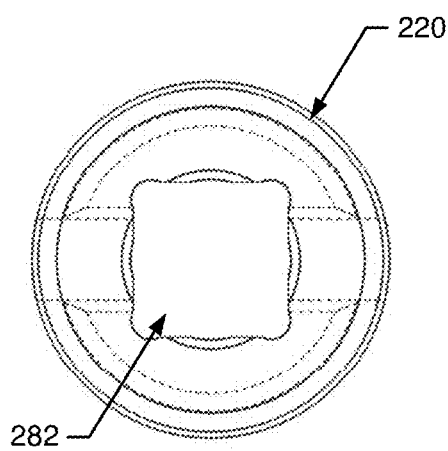
Figure 8C:
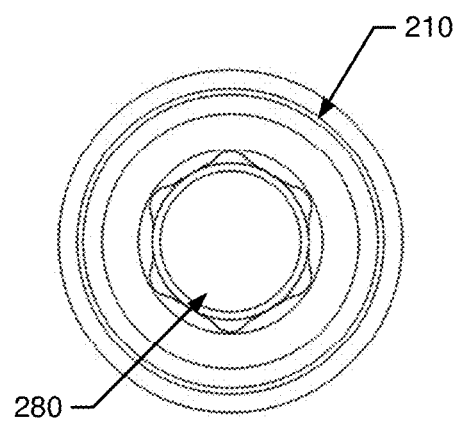
Figure 9A:
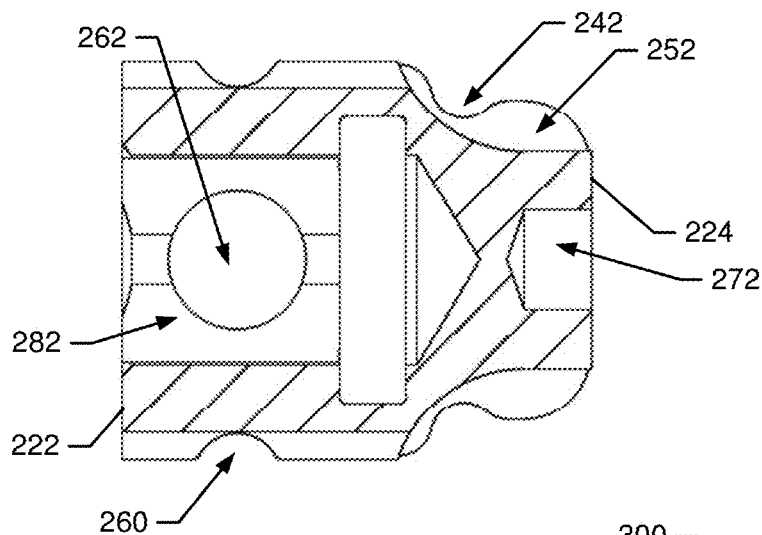
Figure 9B:
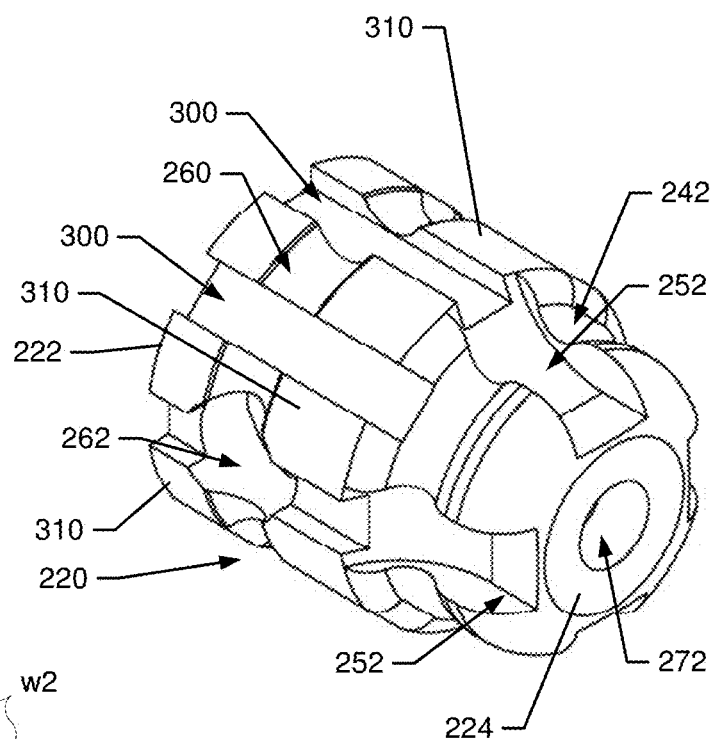
Figure 9C:
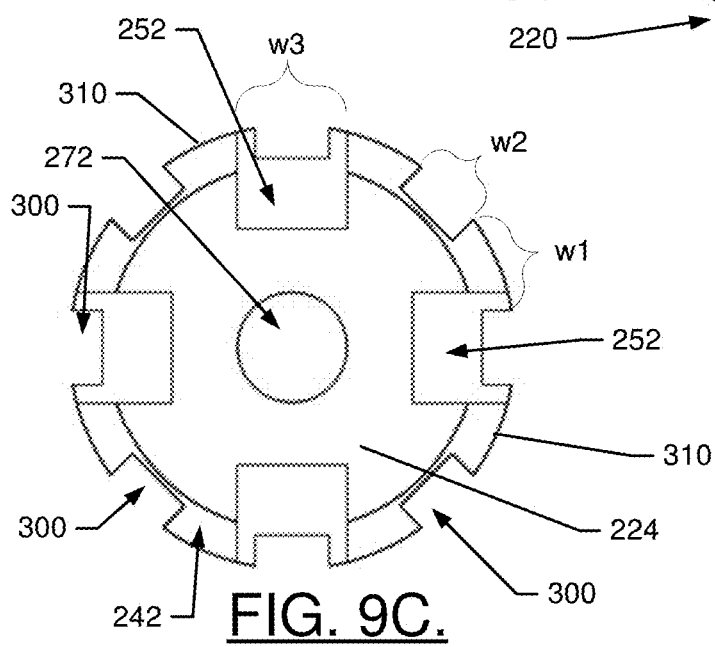

FIG. 3, which includes FIGS. 3A, 3B and 3C, illustrates a side view along the longitudinal axis of the socket, and front and back views of the driving end and driven end of the socket, respectively, according to an example embodiment;

FIG. 4, which includes FIGS. 4A, 4B and 4C, illustrates a cross sectional side view along the longitudinal axis of a drive body of the socket, and perspective and back views of the drive body of the socket, respectively, according to an example embodiment;

FIG. 5, which includes FIGS. 5A, 5B and 5C, illustrates a cross sectional side view along the longitudinal axis of a driven body of the socket, and perspective and back views of the driven body of the socket, respectively, according to an example embodiment;

FIG. 6 illustrates a perspective view of electrically isolated lobes of a driving device according to an example embodiment;

FIG. 7 illustrates a perspective view of the electrically isolated lobes with a molded body portion according to an example embodiment;

FIG. 8, which is defined by FIGS. 8A, 8B and 8C, illustrates a side view along the longitudinal axis of the driving device, and front and back views of the driving end and driven end of the driving device, respectively, according to an example embodiment;

FIG. 9, which is defined by FIGS. 9A, 9B and 9C, illustrates a cross sectional side view along the longitudinal axis of a drive body of the driving device, and perspective and back views of the drive body of the driving device, respectively, according to an example embodiment; and FIG. 10, which is defined by FIGS. 10A, 10B and 10C, illustrates a cross sectional side view along the longitudinal axis of a driven body of the driving device, and perspective and back views of the driven body of the driving device, respectively, according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of electrically isolated socket tools that can be used in proximity to powered components or components that have an electrical charge. In some cases, the user can safely work on or around such components or systems without having to de-energize the system. The electrical isolation provided may eliminate the risk of surge currents traveling from a fastener to a socket tool (such as a socket wrench or a power tool that drives sockets). Particularly for power tools that include electronic components that log data about power tool usage, the isolated socket can protect valuable computer data such as recorded torque information on fasteners and run-down count history for estimating power tool life.

Figure 1:
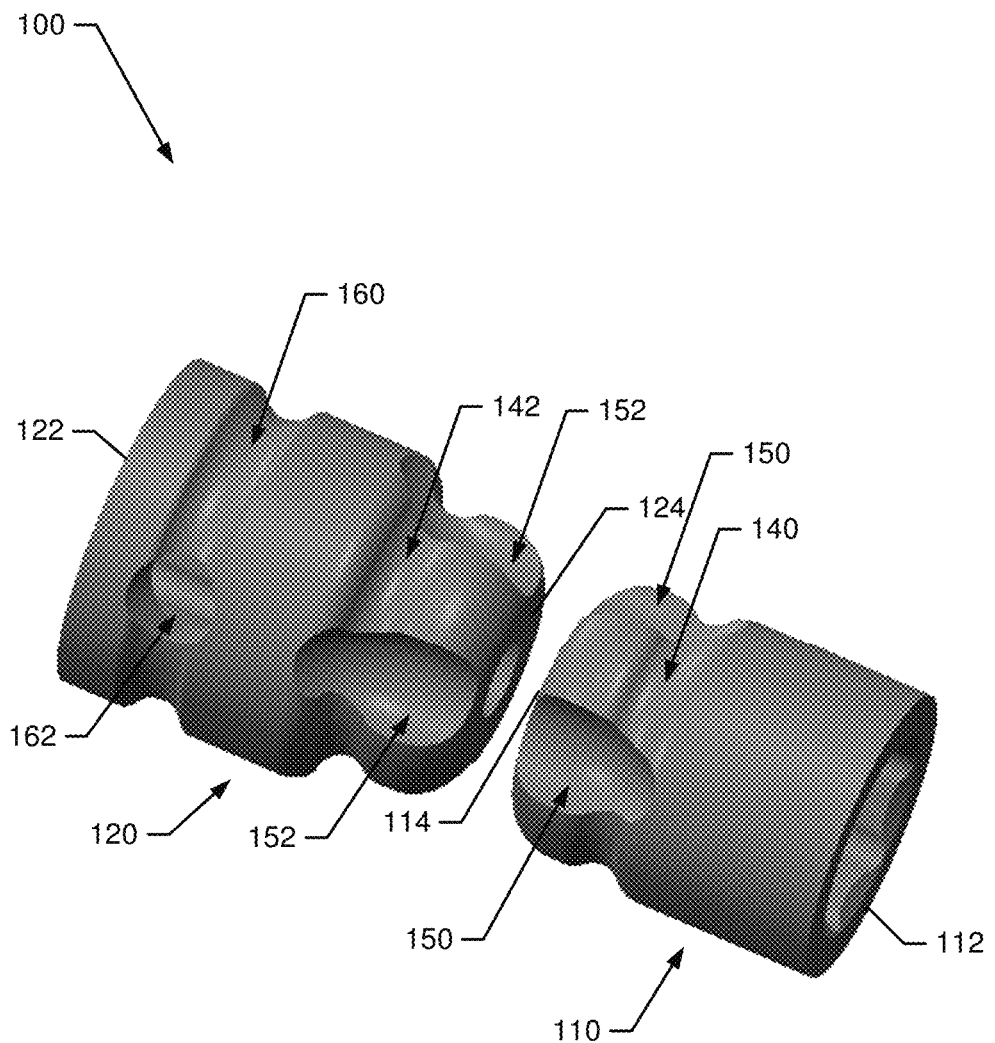
FIG. 1 illustrates a perspective view of electrically isolated lobes of a socket according to an example embodiment.
Figure 2:
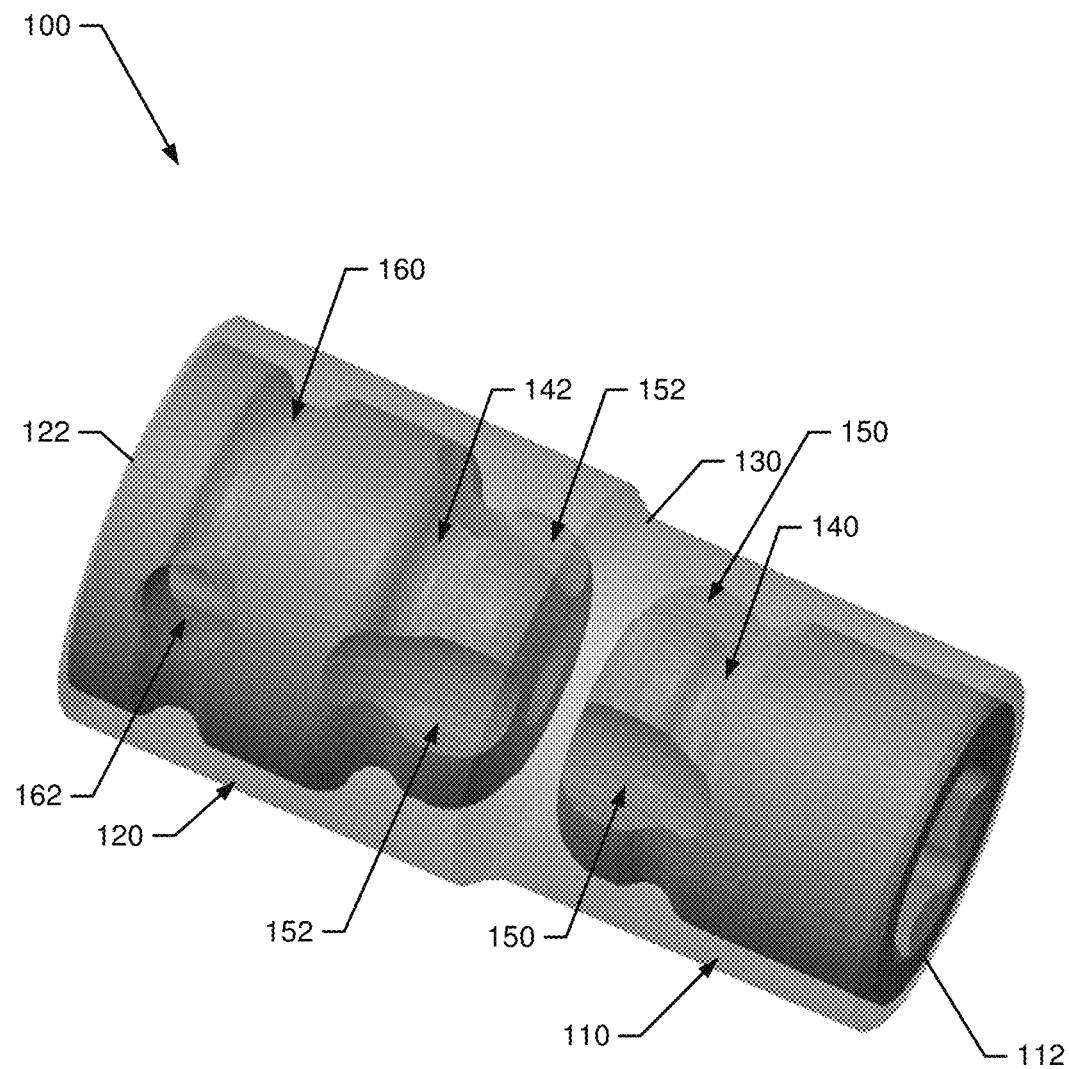
FIG. 2 illustrates a perspective view of the electrically isolated lobes with a molded body portion according to an example embodiment.

FIG. 1 illustrates a perspective view of electrically isolated lobes of a socket (as one example of a driving device) according to an example embodiment, and FIG. 2 illustrates a perspective view of the electrically isolated lobes with a body portion over-molded to operably couple the lobes. FIGS. 3-5 illustrate other views of the socket to further facilitate an understanding of how an example embodiment may be structured. Referring to FIGS. 1 to 5, an electrically isolated socket 100 may include a driven body 110 and a drive body 120. The driven body 110 and drive body 120 may not contact each other, but may be oriented such that a driven end 112 of the driven body 110 and a drive end 122 of the drive body 120 face in opposite directions. Axial centerlines of each of the driven body 110 and the drive body 122 are aligned with each other and with a longitudinal centerline of the socket 100.

The driven body 110 may include a lobular end 114, which faces a lobular end 124 of the drive body 120. As such, the lobular ends 114 and 124 may be proximate to each other, but spaced apart from each other. The lobular ends 114 and 124 may be considered to be "proximal ends" of the driven body 110 and drive body 120, respectively, since they are proximate to each other. The driven end 112 and the drive end 122 may therefore be considered to be "distal ends" since that are distally located relative to each other.

In an example embodiment, both the driven body 110 and the drive body 120 may be made of metallic material (e.g., stainless steel, or other rigid and durable alloys). By making the driven body 110 and drive body 120 of metallic material, the driven body 110 and drive body 120 may each be very durable and able to withstand large amounts of force, torque and/or impact. However, the over-molding of the driven body 110 and the drive body 120 with a non-metallic and insulating material may render the driven body 110 and drive body 120 electrically isolated from each other. Thus, although the advantages of using metallic material are provided with respect to the interfacing portions of the socket 100, the disadvantages relative to use in proximity to electrically powered or charged components may be avoided.

The over-molding may be accomplished to create a body portion 130 of the socket 100. The body portion 130 may surround the lobular ends 114 and 124 and substantially all other portions of the driven body 110 and the drive body 120 except the driven end 112 and the drive end 122, respectively. Thus, metal may be exposed at both the driven end 112 and the drive end 122. Moreover, in some cases, the body portion 130 may extend along the sides of the driven body 110 and the drive body 120 to be flush with the driven end 112 and the drive end 122, respectively.

In an example embodiment, the body portion 130 may be formed from a high strength molding compound, which may be glass-fiber reinforced and/or a plastic composite material. The body portion 130 may be formed around the driven body 110 and the drive body 120 by injection molding to securely bond and completely seal the composite section (i.e., the body portion 130) of the socket 100 to form a substantially cylindrical body of the socket 100. However, depending on the size of the fastener that is to be engaged by the driven body 110, the driven body 110 may be larger or smaller than the drive body 120. Thus, the generally cylindrical shape of the body portion 130 may have a discontinuity in diameter of the portions thereof that correspond to the driven body 110 and drive body 120, respectively, to account for different sizes of fasteners. For example, a driven body 110 that is to engage a ¾" nut will have a larger diameter than a driven body 110 that is to engage a ⅜" nut, thereby providing that respective body portions for a ¾" socket and a ⅜" socket may have corresponding different diameters at their driven bodies. However, the drive body 120 portion of each such socket may be substantially the same diameter if they are to be mated with the same wrench or power tool.

As shown in FIGS. 1 and 2, the driven body 110 may include an annular groove 140 that extends around the circumference of the driven body 110 spaced apart from the lobular end 114 to define a lobe at the lobular end 114. The annular groove 140 may be a ring shaped groove inside which the over-molding material that forms the body portion 130 may fill to prevent or otherwise inhibit axial movement of the driven body 110 relative to the drive body 120. Similarly, the drive body 120 may include an annular groove 142 that extends around the circumference of the drive body 120 spaced apart from the lobular end 124 to define a lobe at the lobular end 124. The annular groove 142 may be a ring shaped groove inside which the over-molding material that forms the body portion 130 may fill to prevent or otherwise inhibit axial movement of the drive body 120 relative to the driven body 110. The annular grooves 140 and 142 each therefore extend in respective planes that are substantially parallel to the planes in which the end faces (at the driven end 112 and drive end 122) of the driven body 110 and drive body 120 lie. Thus, the annular grooves 140 and 142 lie in planes that are parallel to each other and perpendicular to the longitudinal axis of the socket 100 to provide resilience and strength responsive to axially compressive and expansive forces.

The driven body 110 is also provided with axial grooves 150 that are defined over a periphery of the lobular end 114. In an example embodiment, the axial grooves 150 may extend from the annular groove 140 to the lobular end 114 in a direction substantially parallel to the longitudinal axis of the socket 100. The axial grooves 150 may be spaced apart from each other around the periphery of the lobe formed proximate to the lobular end 114 of the driven body 110. The spacing between each of the axial grooves 150 may be equidistant. Moreover, in some cases, each axial groove 150 may extend over forty-five degrees and may be separated from a next axial groove 150 by forty-five degrees such that four axial grooves 150 (and four respective separation portions therebetween) account for the full three hundred and sixty degree circumference of the lobe formed at the lobular end 114 of the driven body 110.

Similarly, the drive body 120 is also provided with axial grooves 152 that are defined over a periphery of the lobular end 124. In an example embodiment, the axial grooves 152 may extend from the annular groove 142 to the lobular end 124 in a direction substantially parallel to the longitudinal axis of the socket 100. The axial grooves 152 may be spaced apart from each other around the periphery of the lobe formed proximate to the lobular end 124 of the drive body 120. The spacing between each of the axial grooves 152 may be equidistant. Moreover, in some cases, each axial groove 152 may extend over forty-five degrees and may be separated from a next axial groove 152 by forty-five degrees such that four axial grooves 152 (and four respective separation portions therebetween) account for the full three hundred and sixty degree circumference of the lobe formed at the lobular end 124 of the drive body 120. Other combinations of numbers of grooves and angular widths of the grooves (and separation portions) may vary in other example embodiments. For example, grooves and separation portions could range from about 20 degrees to about 60 degrees. Depths of the grooves may also vary from 5% of the diameter of the respective bodies to 20% of the diameter of the respective bodies.

In an example embodiment, the number of axial grooves 150 on the driven body 110 may be equal to the number of grooves 152 on the drive body 120. Moreover, the sizes of the axial grooves 150 and 152 may be the same. Accordingly, the axial grooves 150 on the driven body 110 may be aligned with the grooves 152 on the drive body 120. This alignment of axial grooves 150 and 152, particularly when the over-molding material fills in such grooves, provides a relatively large mass of aligned over-molding material to provide strength and resilience for rotational forces in either tightening or loosening directions. Thus, the driven body 110 and the drive body 120 can be durably coupled to withstand high amounts of rotational force without breaking. Moreover, since the axial grooves 150 and 152 are relatively large in size, they will not strip like smaller triangular ridges that extend parallel to each other might be prone to doing. The over-molding material may also fill the grooves in such a way that no bubbles or air gaps are formed to further enhance the strength and durability of the body portion 130.

In some cases, the drive body 120 may further include a second annular groove 160 that may include a pin receiver 162. The second annular groove 160 and/or the pin receiver 162 may be used for facilitating affixing the drive body 120 to the power tool or wrench that is used to drive the socket 100 via passing of a pin through the pin receiver 162. Thus, the pin receiver 162 may extend through the drive body 120 (at the second annular groove 160) substantially perpendicular to the longitudinal axis of the socket 100. The second annular groove 160 may be provided between the annular groove 142 and the drive end 122 proximate to (but spaced apart from) the drive end 122.

In an example embodiment, any or all of the grooves (e.g., the axial grooves 150 and 152 and the annular grooves 140, 142 and 160) may be formed by machining. Alternatively, some or all of the grooves may be formed during the molding/casting process for each respective one of the driven body 110 and the drive body 120. Moreover, as shown in FIGS. 4 and 5, the lobular ends 114 and 124 may each include an axial orifice 170 and 172, respectively. The axial orifices 170 and 172 may be aligned with each other to further provide a place for a solid mass of aligned over-molding material to cooperate to increase the strength of the socket 100. These axial orifices 170 and 172 may also be either machined into the driven body 110 and drive body 120, respectively, or may be formed during the molding/casting process. The axial orifices 170 and 172 may be on opposite sides of the respective mating orifices 180 and 182 of the driven body 110 and drive body 120, respectively (see FIG. 3). The mating orifices 180 and 182 may be shaped to receive a portion of the power tool/wrench providing torque to the drive body 120 and driving the fastener via the driven body 110.

Other example embodiments may provide slightly different structures that are configured to perform the functions described above. For example, FIGS. 6-10 illustrate another structural arrangement for providing an electrically insulated driving device such as a socket, bit driver or nut driver for driving a corresponding fastener. FIG. 6 illustrates a perspective view of electrically isolated lobes of a driving device (e.g., a fastener driving device) according to an example embodiment, and FIG. 7 illustrates a perspective view of the electrically isolated lobes with a body portion over-molded to operably couple the lobes. FIGS. 8-10 illustrate other views of the socket to further facilitate an understanding of how an example embodiment may be structured. Referring to FIGS. 6 to 10, an electrically isolated fastener driving device 200 may include a driven body 210 and a drive body 220. The driven body 210 and drive body 220 may not contact each other, but may be oriented such that a driven end 212 of the driven body 210 and a drive end 222 of the drive body 220 face in opposite directions. Axial centerlines of each of the driven body 210 and the drive body 222 are aligned with each other and with a longitudinal centerline of the driving device 200.

The driven body 210 may include a lobular end 214, which faces a lobular end 224 of the drive body 220. As such, the lobular ends 214 and 224 may be proximate to each other, but spaced apart from each other. The lobular ends 214 and 224 may be considered to be "proximal ends" of the driven body 210 and drive body 220, respectively, since they are proximate to each other. The driven end 212 and the drive end 222 may therefore be considered to be "distal ends" since that are distally located relative to each other.

In an example embodiment, both the driven body 210 and the drive body 220 may be made of metallic material (e.g., stainless steel, or other rigid and durable alloys). By making the driven body 210 and drive body 220 of metallic material, the driven body 210 and drive body 220 may each be very durable and able to withstand large amounts of force, torque and/or impact. However, the over-molding of the driven body 210 and the drive body 220 with a non-metallic and insulating material may render the driven body 210 and drive body 220 electrically isolated from each other. Thus, although the advantages of using metallic material are provided with respect to the interfacing portions of the driving device 200, the disadvantages relative to use in proximity to electrically powered or charged components may be avoided.

The over-molding may be accomplished to create a body portion 230 of the driving device 200 (see FIG. 7). The body portion 230 may surround the lobular ends 214 and 224 and substantially all other portions of the driven body 210 and the drive body 220 except the driven end 212 and the drive end 222, respectively. Thus, metal may be exposed at both the driven end 212 and the drive end 222. Moreover, in some cases, the body portion 230 may extend along the sides of the driven body 210 and the drive body 220 to be flush with the driven end 212 and the drive end 222, respectively.

In an example embodiment, the body portion 230 may be formed from a high strength molding compound, which may be glass-fiber reinforced and/or a plastic composite material. The body portion 230 may be formed around the driven body 210 and the drive body 220 by injection molding to securely bond and completely seal the composite section (i.e., the body portion 230) of the driving device 200 to form a substantially cylindrical body of the driving device 200. However, depending on the size of the fastener that is to be engaged by the driven body 210, the driven body 210 may be larger or smaller than the drive body 220. Thus, the generally cylindrical shape of the body portion 230 may have a discontinuity in diameter of the portions thereof that correspond to the driven body 210 and drive body 220, respectively, to account for different sizes of fasteners. For example, a driven body 210 that is to engage a ¾" nut will have a larger diameter than a driven body 210 that is to engage a ⅜" nut, thereby providing that respective body portions for a ¾" socket and a ⅜" socket may have corresponding different diameters at their driven bodies. However, the drive body 220 portion of each such socket may be substantially the same diameter if they are to be mated with the same wrench or power tool.

As shown in FIGS. 6 and 7, the driven body 210 may include an annular groove 240 that extends around the circumference of the driven body 210 spaced apart from the lobular end 214 to define a lobe extending from the annular groove 240 to the lobular end 214. The annular groove 240 may be a ring shaped groove inside which the over-molding material that forms the body portion 230 may fill to prevent or otherwise inhibit axial movement of the driven body 210 relative to the drive body 220. Similarly, the drive body 220 may include an annular groove 242 that extends around the circumference of the drive body 220 spaced apart from the lobular end 224 to define a lobe extending from the annular groove 242 to the lobular end 224. The annular groove 242 may be a ring shaped groove inside which the over-molding material that forms the body portion 230 may fill to prevent or otherwise inhibit axial movement of the drive body 220 relative to the driven body 210. The annular grooves 240 and 242 each therefore lie in respective planes that are substantially parallel to the planes in which the end faces (at the driven end 212 and drive end 222) of the driven body 210 and drive body 220 lie. Thus, the annular grooves 240 and 242 lie in planes that are also substantially parallel to each other and substantially perpendicular to the longitudinal axis of the driving device 200 to provide resilience and strength responsive to axially compressive and expansive forces.

The driven body 210 is also provided with axial grooves 250 that are defined over a periphery of the lobular end 214 from the lobular end 214 toward the driven end 212 at least past the annular groove 240. In an example embodiment, the axial grooves 250 may extend from a location proximate to the annular groove 240 all the way to the lobular end 214 following a direction substantially parallel to the longitudinal axis of the driving device 200. The axial grooves 250 may be spaced apart from each other around the periphery of the lobe formed from the annular groove 240 to the lobular end 214 of the driven body 210, and may extend in a direction substantially parallel to each other. The spacing between each of the axial grooves 250 may be equidistant.

Moreover, in some cases, a longitudinal centerline of each axial groove 250 may be about 90 degrees separated from a longitudinal centerline of a next axial groove 250 such that four axial grooves 250 (and four respective separation portions therebetween) account for the full three hundred and sixty degree circumference of the lobe formed to extend from the lobular end 214 to the annular groove 240 of the driven body 210.

Similarly, the drive body 220 is also provided with axial grooves 252 that are defined over a periphery of the lobular end 224 from the lobular end 224 toward the drive end 222 at least past the annular groove 242. In an example embodiment, the axial grooves 252 may extend from a location proximate to the annular groove 242 all the way to the lobular end 224 following a direction substantially parallel to the longitudinal axis of the driving device 200. The axial grooves 252 may be spaced apart from each other around the periphery of the lobe formed from the annular groove 242 to the lobular end 224 of the drive body 220. The spacing between each of the axial grooves 252 may be equidistant. Moreover, in some cases, a longitudinal centerline each axial groove 252 may be separated from a longitudinal centerline of a next axial groove 252 by ninety degrees such that four axial grooves 252 (and four respective separation portions therebetween) account for the full three hundred and sixty degree circumference of the lobe formed from the annular groove 242 to the lobular end 224 of the drive body 220. Other combinations of numbers of grooves and angular widths of the grooves (and separation portions) may vary in other example embodiments. For example, grooves and separation portions could range from about 20 degrees to about 60 degrees. Depths of the grooves may also vary from 5% of the diameter of the respective bodies to 20% of the diameter of the respective bodies.

In an example embodiment, the number of axial grooves 250 on the driven body 210 may be equal to the number of grooves 252 on the drive body 220. Moreover, the sizes of the axial grooves 250 and 252 may be substantially the same. Accordingly, the axial grooves 250 on the driven body 210 may be aligned with the grooves 252 on the drive body 220. However, in alternative embodiments (such as that which is shown in FIGS. 6-10C), the axial grooves 250 on the driven body 210 may be offset from the axial grooves 252 on the drive body 220. In this regard, for example, a longitudinal centerline of each axial groove 250 on the driven body 210 may be aligned with a point substantially half way between adjacent axial grooves 252 on the drive body 220 (and vice versa). This purposeful misalignment of axial grooves 250 and 252, particularly when the over-molding material fills in such grooves, provides relatively large alternating masses of over-molding material to provide strength and resilience for rotational forces in either tightening or loosening directions. Thus, the driven body 210 and the drive body 220 can be durably coupled to withstand high amounts of rotational force without breaking. Moreover, since the axial grooves 250 and 252 are relatively large in size, the axial grooves 250 and 252 will not strip like smaller triangular ridges that extend parallel to each other might be prone to doing. The over-molding material may also fill the grooves in such a way that no bubbles or air gaps are formed to further enhance the strength and durability of the body portion 130. Additionally, the substantially rectangular cross section of each of the axial grooves 250 and 252 provides increased resistance to rotational forces relative to a rounded or triangular cross section.

In some cases, the drive body 220 may further include a second annular groove 260 that may include a pin receiver 262. The second annular groove 260 and/or the pin receiver 262 may be used for facilitating affixing the drive body 220 to the power tool or wrench that is used to drive the driving device 200 via passing of a pin through the pin receiver 262. Thus, the pin receiver 262 may extend through the drive body 220 (at the second annular groove 260) substantially perpendicular to the longitudinal axis of the driving device 200. The second annular groove 260 may be provided between the annular groove 242 and the drive end 222 proximate to (but spaced apart from) the drive end 222.

In an example embodiment, any or all of the grooves (e.g., the axial grooves 250 and 252 and the annular grooves 240, 242 and 260) may be formed by machining. Alternatively, some or all of the grooves may be formed during the molding/casting process for each respective one of the driven body 210 and the drive body 220. Moreover, as shown in FIGS. 9 and 10, the lobular ends 214 and 224 may each include an axial orifice 270 and 272, respectively. The axial orifices 270 and 272 may be aligned with each other to further provide a place for a solid mass of aligned overmolding material to cooperate to increase the strength of the driving device 200. These axial orifices 270 and 272 may also be either machined into the driven body 210 and drive body 220, respectively, or may be formed during the molding/casting process. The axial orifices 270 and 272 may be on opposite sides of the respective mating orifices 280 and 282 of the driven body 110 and drive body 120, respectively (see FIG. 8). The mating orifices 280 and 282 may be shaped to receive a portion of the power tool/wrench providing torque to the drive body 220 and driving the fastener via the driven body 210.

Referring now to FIG. 9, which is defined by FIGS. 9A, 9B and 9C, some example embodiments may include yet further axial grooves to increase the strength of the driving device 200 for handling of axial torque. In this regard, a second set of axial grooves 300 may be formed about the periphery of a portion of the drive body 220 that extends from the axial groove 242 to the drive end 222. The second set of axial grooves 300 may, along with the axial grooves 252 have a substantially rectangular cross sectional shape and a longitudinal centerline of the second set of axial grooves 300 may extend substantially parallel to the direction of extension of the longitudinal centerline of the axial grooves 252. In some cases, eight instances of the grooves among the second set of axial grooves 300 may be employed with respective separation portions 310 provided therebetween. Given that the second set of axial grooves 300 have a substantially rectangular cross section, it can be appreciated that the widths (w1) of the separation portions 310 may be slightly larger than the widths (w2) of the grooves of the second set of axial grooves 300. The widths (w2) of the grooves of the second set of axial grooves 300 may also be smaller than the widths (w3) of the axial grooves 252.

As shown in FIGS. 9B and 9C, each longitudinal centerline of a groove of the second set of axial grooves 300 may be offset from an adjacent groove of the second set of axial grooves 300 by about 45 degrees. Accordingly, every other one of the grooves of the second set of axial grooves 300 may be substantially aligned with a corresponding one of the axial grooves 252. The second set of axial grooves 300 may pass through the second annular groove 260 (e.g., extending substantially perpendicular thereto) at a depth equal to or greater than the depth of the second annular groove 260. However, the second axial grooves 300 may have a depth that is less than a depth of the annular groove 242. Additionally, the depth of the axial grooves 252 may be deeper than each of the second set of axial grooves 300, the second annular groove 260 and the annular groove 242. Moreover, although the shapes of the axial grooves 252 and the second set of axial grooves 300 are similar (i.e., having a substantially rectangular cross section), the width and depth of the axial grooves 252 may be larger. Meanwhile the longitudinal length of the second set of axial grooves 300 may be longer than the longitudinal length of the axial grooves 252.

Referring now to FIG. 10, which is defined by FIGS. 10A, 10B and 10C, some example embodiments of the driven body 210 may also include yet further axial grooves to increase the strength of the driving device 200 for handling of axial torque. In this regard, a second set of axial grooves 320 may be formed about the periphery of a portion of the driven body 210 that extends from the axial groove 240 to the driven end 212. The second set of axial grooves 320 may, along with the axial grooves 250 have a substantially rectangular cross sectional shape and a longitudinal centerline of the second set of axial grooves 320 may extend substantially parallel to the direction of extension of the longitudinal centerline of the axial grooves 250. In some cases, eight instances of the grooves among the second set of axial grooves 320 may be employed with respective separation portions 330 provided therebetween. At the periphery of the driven body 210, the second set of axial grooves 320 and the separation portions 330 may each extend over about 22.5 degrees to account for the full 360 degree periphery of the driven body 210.

As shown in FIGS. 10B and 10C, each longitudinal centerline of a groove of the second set of axial grooves 320 may be offset from an adjacent groove of the second set of axial grooves 320 by about 45 degrees. However, the second set of axial grooves 320 may be offset relative to the axial grooves 250. Accordingly, every other one of the separation portions 330 may be substantially aligned with a corresponding one of the axial grooves 250. The second set of axial grooves 320 may pass through the annular groove 240 (e.g., extending substantially perpendicular thereto) at a depth less than the depth of the annular groove 240. Although the shapes of the axial grooves 250 and the second set of axial grooves 320 are similar (i.e., having a substantially rectangular cross section), the width and depth of the axial grooves 250 may be larger. Meanwhile the longitudinal length of the second set of axial grooves 320 may be longer than the longitudinal length of the axial grooves 250.

As can be appreciated from FIG. 6, the second axial grooves 320 of the driven body 210 may be substantially aligned with the separation portions 310 of the drive body 220. Meanwhile, the second axial grooves 300 of the drive body 220 may be substantially aligned with the separation portions 330 of the driven body 210.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are That which is claimed:

1. An electrically isolated driving device comprising:
a driven body made of first material and having a driven end configured to interface with a fastener;
a drive body made of a second material and having a drive end configured to interface with a driving tool; and
a body portion made of an electrically insulating material, the body portion coupled to the driven body and the drive body,
wherein the drive end of the drive body and the driven end of the driven body face away from each other, and the drive body and the driven body each include grooves.

2. The driving device of claim 1, wherein the first material and the second material are the same.

3. The driving device of claim 1, wherein the first material and the second material are different.

4. The driving device of claim 1, wherein the driven body and the drive body are both centered along a common rotational axis.

5. The driving device of claim 1, wherein the grooves of the driven body are defined over periphery of the driven body.

6. The driving device of claim 5, wherein each of the grooves of the drive body are defined to be equidistant from each other around the periphery of the drive body.

7. The driving device of claim 1, wherein the body portion is disposed around at least a portion of the periphery of the driven body.

8. The driving device of claim 1, wherein the grooves of the drive body are offset from the grooves of the driven body.

9. The driving device of claim 8, wherein the body portion extends into the grooves of the drive body and the grooves of the driven body.

10. An electrically isolated adapter comprising:
a driven body made of a metallic material and having a driven end configured to interface with a fastener;
a drive body made of a metallic material and having a drive end configured to interface with a driving tool; and
a body portion made of an electrically insulating material over-molding portions of the drive body and the driven body,
wherein the drive end of the drive body and the driven end of the driven body face away from each other, and the drive body and driven body each include grooves;
wherein a pin receiver is formed through the drive body at an annular groove formed proximate to the drive end.

11. The adapter of claim 10, wherein the body portion extends into a space defined between portions of the drive body and driven body that face each other.

12. The adapter of claim 10, wherein the drive body and a driven body are each substantially cylindrical.

13. The adapter of claim 10, wherein the grooves of the driven body have a different length than the grooves of the drive body.

14. The adapter of claim 10, wherein the body portion extends along sides of each of the drive body and driven body and is flush with the drive end and the driven end, and further wherein over-molding material forming the body portion comprises glass fiber reinforced, composite plastic.

15. An electrically isolated adapter comprising:
a driven body made of first material and having a driven end configured to interface with a fastener;
a drive body made of a second material and having a drive end configured to interface with a tool; and
a body portion over-molding portions of the drive body and the driven body, but not the drive end and the driven end,
wherein the drive body is electrically isolated from the driven body, and
wherein the drive end of the drive body and the driven end of the driven body face away from each other, and the drive body and driven body each include axial grooves.

16. The electrically isolated adapter of claim 15, wherein the axial grooves of the driven body have a different length than the axial grooves of the drive body.

17. The electrically isolated adapter of claim 16, wherein a diameter of the drive body and a diameter the driven body are different.

18. The electrically isolated adapter of claim 15, wherein the body portion comprises a plastic composite material.

19. The driving device of claim 15, wherein at least one of the drive body or the driven body includes an axial orifice and wherein the axial orifice is aligned with a longitudinal axis of the both the drive body and the driven body.

* * * * *